United States Patent [19]

Wu et al.

[11] Patent Number: 5,279,312
[45] Date of Patent: Jan. 18, 1994

[54] METHOD FOR PROCESSING DRIED WHOLE CLOVES

[75] Inventors: Dan T. Wu; Wong Foo-Kong, both of Surabaya, Indonesia

[73] Assignee: P.T.H.M. Sampoerna, Indonesia

[21] Appl. No.: 762,551

[22] Filed: Sep. 18, 1991

[51] Int. Cl.⁵ .............................................. A24B 15/00
[52] U.S. Cl. ..................................... 131/369; 131/303
[58] Field of Search ........................ 131/359, 369, 303; 426/476, 510, 511

[56] References Cited

U.S. PATENT DOCUMENTS 4,572,218  2/1986  Hine et al. ............................ 131/303
5,119,836  6/1992  White .................................... 131/369

Primary Examiner—V. Millin
Assistant Examiner—William M. Pierce
Attorney, Agent, or Firm—Fliesler, Dubb, Meyer & Lovejoy

[57] ABSTRACT

A continuous method for processing dry whole cloves into particles suitable for inclusion in cigarettes comprising steps of: a) raising the moisture content of the whole dried cloves by (i) providing said cloves in a heat conducting receptacle, and (ii) simultaneously providing steam and water into said receptacle; b) continuously slicing said moisturized whole cloves into finely chopped particles; and c) drying said clove particles at a variety of different convective air drying rates and temperatures. Apparatuses includes means for conditioning whole dried cloves, including a trough, means for inputting a quantity of whole dried cloves into the trough, the trough having a top and a bottom, and a fully flighted screw conveyor for transporting a quantity of whole cloves therethrough. The trough further includes a plurality of steam inputs oriented at the bottom of the trough and a plurality of water inputs located at the top of the trough. The combination further includes means for cutting said cloves, a hopper, a first and second converging slotted conveyor belt, and a rotating knife drum. Additionally, the combination includes a conveyor dryer having a plurality of independently controlled drying chambers and a conveyor belt for providing said cloves through said plurality of drying chambers.

11 Claims, 8 Drawing Sheets

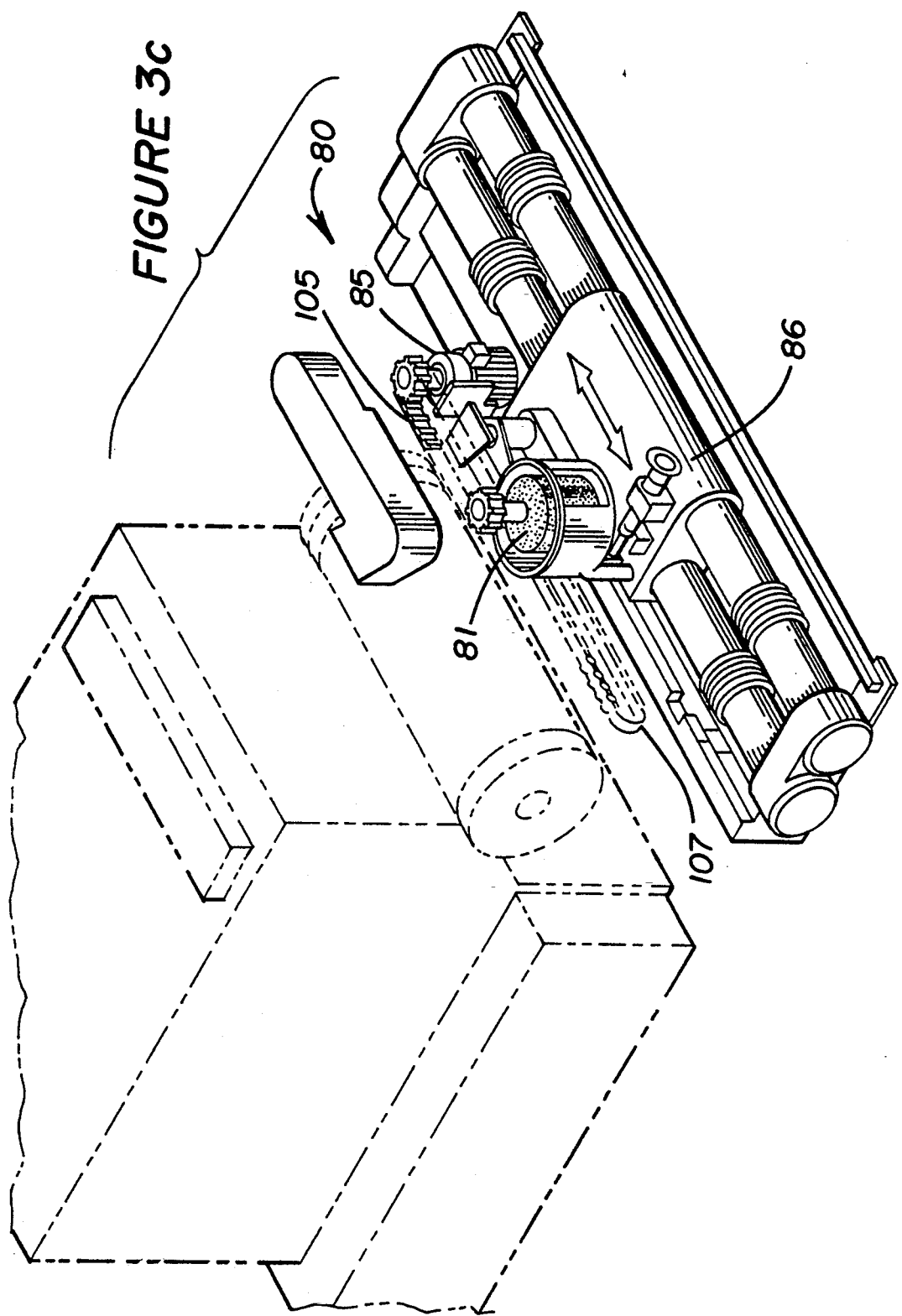

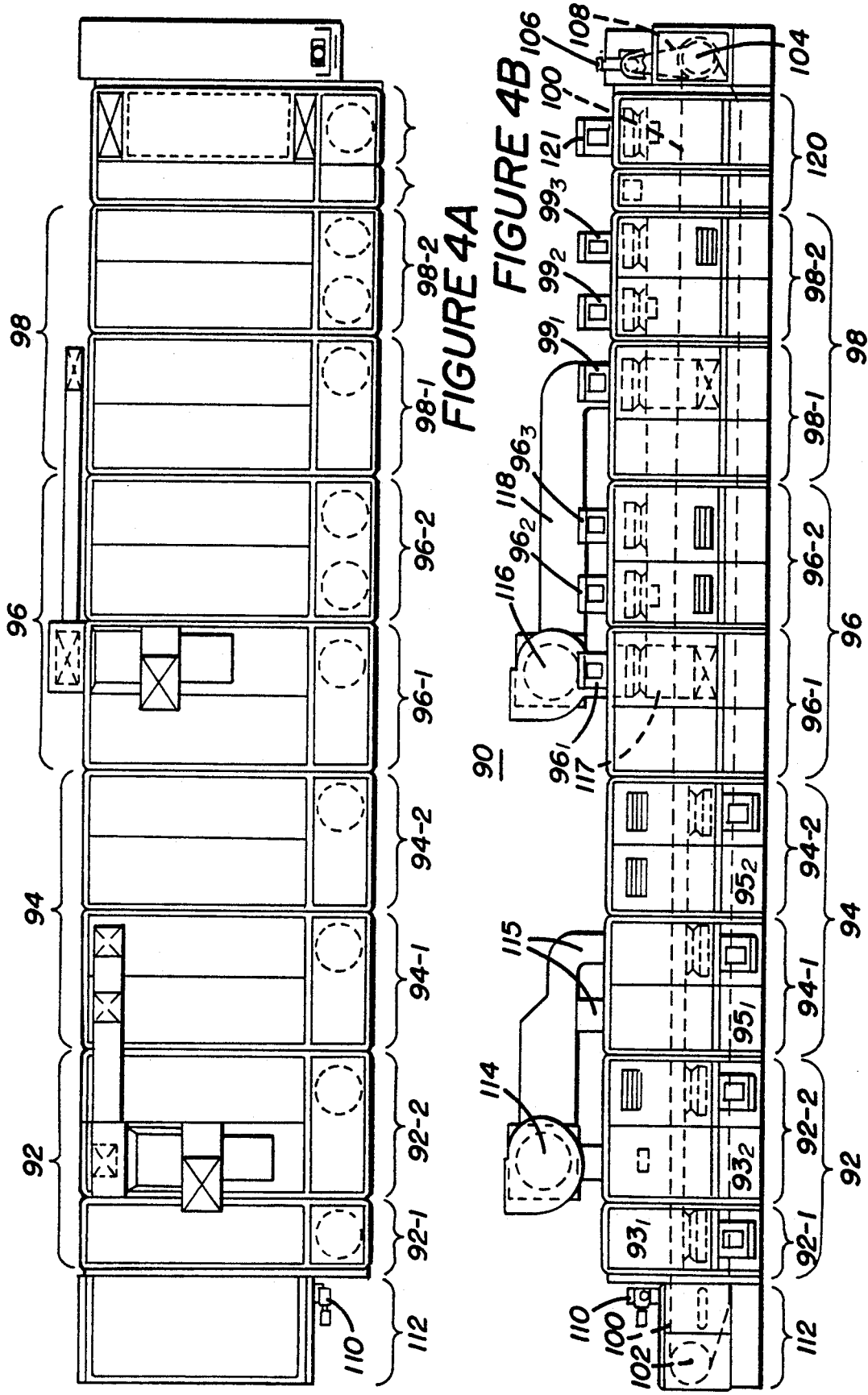

METHOD FOR PROCESSING DRIED WHOLE CLOVES

BACKGROUND OF THE INVENTION

1. Field of the Invention

The invention relates to preparation of out dried clove slices from whole cloves for provision into cut tobacco rag suitable for manufacturing cigarettes.

2. Description of the Related Art

Cloves, the dried flower buds of the tropical tree Eugenia Aromatica of the Myrtle family, are popularly used as a spice with myriad applications. One such popular application is the mixture of dried clove slices into tobacco rag suitable for smoking in a cigarette.

Several conventional processes are currently in use for producing slices of out, dried cloves from whole cloves for use in a mixture of tobacco rag. Such conventional processes suffer from three general problems: (1) a large amount of physical space is required to produce commercial quantities of cut cloves; (2) the processes are step specific and generally not automated, resulting in a substantial amount of time being consumed for each step and the process as a whole; and (3) the process of shearing or outting cloves produces clove dust which is undesirable to the final tobacco rag product. Generally, cloves are received from commercial agricultural producers arrive as whole, dried buds. To process the whole cloves into cut slices suitable for tobacco rag, the moisture content of whole, dried cloves must be increased before subjecting the whole cloves to a shearing process. Increasing the moisture content of whole cloves is necessary in order to reduce the amount of clove dust which is produced during the shearing process. Clove dust is not only a waste of clove material, but also reduces the quality of sheared product when included in the processed tobacco rag.

Conventional processes involve soaking dried whole cloves in large, water soaking tanks and subsequently drip drying the soaked cloves before subjecting the cloves to shearing cutters. Several problems exist with this water soaking process. First, water soaking and subsequent drip drying is generally very time consuming, taking up to 10 hours for a single batch of cloves. Second, a large volume of water is required for this soaking process and high volume soaking tanks are required to produce a commercial quantity of cloves, resulting in the requirement of a large amount of physical space for production. The disposal of such large volumes of waste water presents yet another problem.

With regard to the shearing process, most shearing cutters yield a low volume rate of cut cloves per unit of time. In addition, the particle size distribution of the cut product is poor, resulting in a high level of clove dust even after the conventional soaking process. In addition, the cutting shears must be stopped and sharpened after a few hours in operation, thereby resulting in further delays in the manufacturing process.

After the clove slices are formed from the shearing cutters, the cut cloves are then sun dried or passed through high temperature mechanical rotary driers or vibro-driers. Sun drying requires large open spaces and is obviously dependent on the availability of sunshine. Furthermore, frequent turning of the cut clove layer generates additional clove dust. Mechanical rotary and vibro-driers operating at high temperatures result in a loss of clove oil which lessens the quality of the cut product and the quality of the smoking article. Tumbling or vibrating the cut cloves through such driers will also give rise to further generation of clove dust.

Thus, an object of the invention is to provide an improved process for the manufacture of cut, dried cloves.

A further object of the invention is to provide a process wherein the use of large volume water soaking of whole cloves is eliminated.

A further object of the invention is to provide a process which can continually process cloves.

A further object of the invention is to provide a process which improves the processing time per unit of volume over prior art processing systems.

A further object of the invention is to provide the above objects in a system which provides moisturized whole cloves of similar conditioning to that of conventional processes for provision to shearing mechanisms.

A further object of the invention is to provide a process which provides high quality cut portions of whole cloves for inclusion into out tobacco rag suitable for the manufacture of cigarettes.

A further object of the invention is to provide an automated process for maintaining the shearing mechanism in prime shearing condition.

Yet another object of the invention is to provide for the reduction of clove dust resulting from the above processes.

A still further object of the invention is to provide the above objects of the invention in conjunction with a continuous drying process.

SUMMARY OF THE INVENTION

These and other objects of the invention are provided in a continuous method for processing dry whole cloves into particles suitable for inclusion in cigarettes and the like comprising steps of: a) raising the moisture content of the whole dried cloves by (i) providing said cloves in a heat conducting receptacle, and (ii) simultaneously providing steam and water into said receptacle; b) continuously slicing said moisturized whole cloves into finely chopped particles; and c) drying said clove particles at a variety of different convective air drying rates and temperatures.

An apparatus for implementing the present invention includes means for conditioning a quantity of whole dried cloves including an input coupled to a trough, the trough having a top and a bottom, and including a fully flighted screw conveyor for transporting a quantity of whole cloves therethrough. The trough further includes a plurality of steam inputs oriented at the bottom of the trough and a plurality of water inputs located at the top of the trough. The trough further includes an output to which the quantity of whole cloves is passed. In combination also included is means for cutting the cloves having an input coupled to the output of the trough, a hopper, a first and second converging slotted conveyor belt, and a rotating knife drum which includes a plurality of outting knives arranged thereon. Additionally, in combination with the aforementioned means, a conveyor dryer having a plurality of independently controlled drying chambers and a conveyor belt for providing said cloves through said plurality of drying chambers is provided.

BRIEF DESCRIPTION OF THE DRAWINGS

FIG. 3c is a partially exploded, perspective view of the grinder assembly of the apparatus of FIG. 3.

FIGS. 4a and 4b are top and side views, respectively, of an apparatus for continuously drying conditioned, cut cloves in accordance with the method and apparatus of the present invention.

DETAILED DESCRIPTION OF THE INVENTION

Figure 1:
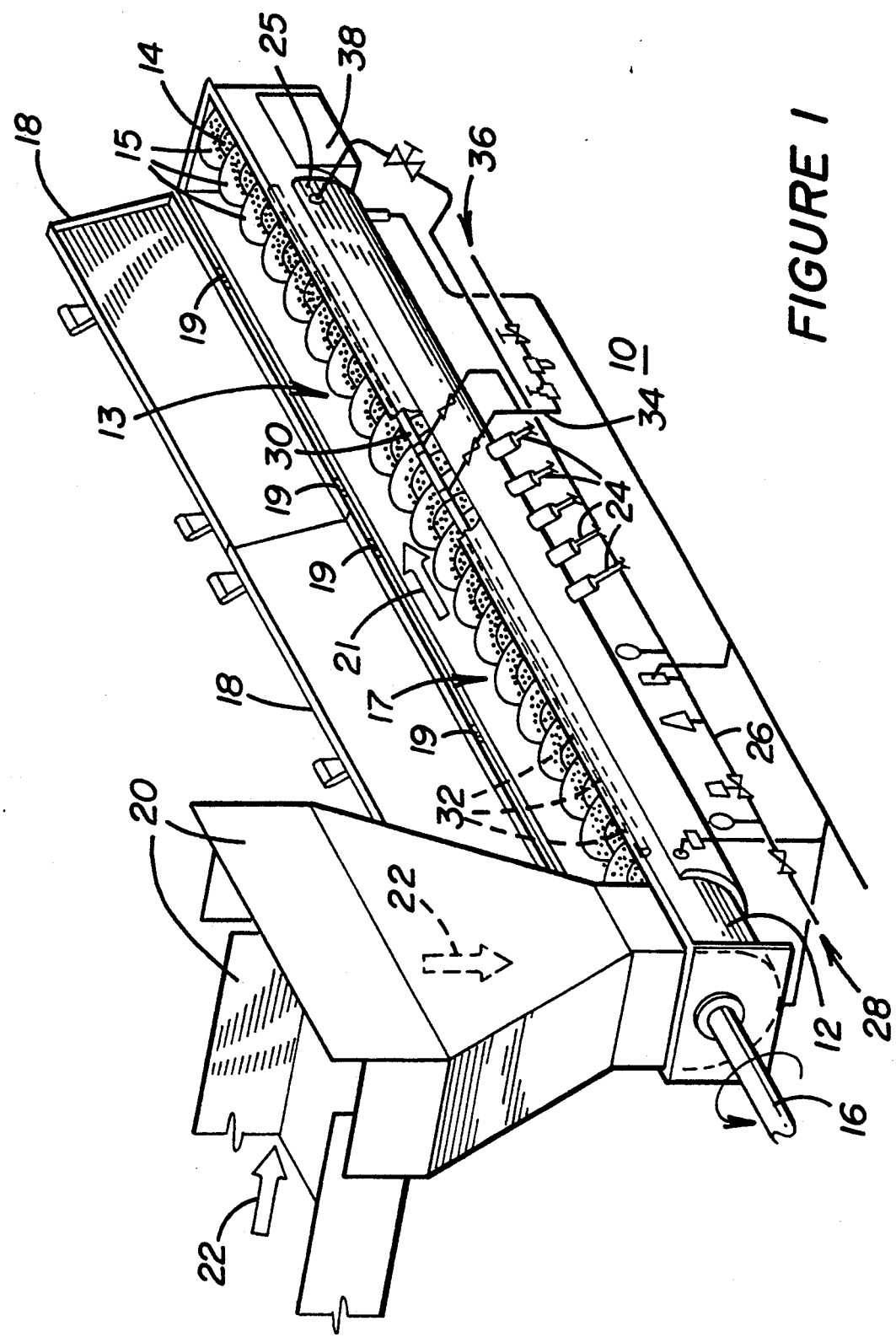
FIG. 1 is an isometric view of an apparatus for conditioning dry, whole cloves in accordance with the method and apparatus of the present invention.

The invention will be described herein with reference to the preferred embodiments. It will be understood by those skilled in the art that numerous modifications are within contemplation of the invention as disclosed by the specification and claims.

The method of the present invention will be described within the context of the preferred apparatus for accomplishing the present invention shown in FIGS. 1-4.

FIG. shows conditioning apparatus 10 for conditioning whole, dry cloves and preparing such cloves for provision to a shearing device. Apparatus 10 replaces the conventional large volume water tanks used for soaking dried whole cloves and provides an automated, continual process for manufacturing clove slices for cigarettes.

Apparatus 10 generally includes U-shaped trough 12 having a fully flighted screw 14, including corkscrew vane 15 circumferencially disposed thereabout, for moving a plurality of whole cloves 17 through U-shaped trough 12.

U-shaped trough 12 is equipped with cover portions 18 which rotate about hinges 19 to cover trough 12, thereby defining a contained region within U-shaped trough 12 to avoid spillage of whole cloves within the apparatus 10. Generally, cover portions 18 are closed during operation of apparatus 10. Hopper 20 is provided for loading dried whole cloves into apparatus 10 along the direction of arrows 22. Fully flighted screw 14 is coupled to drive shaft 16, driven by an external motor (not shown), to rotate screw 14 in a counterclockwise direction. Once in U-shaped trough 12, whole cloves 17 are moved along trough 12 in the direction of arrow 21 to delivery shoot 38. Trough 12 is preferably manufactured from a heat conductive material such as aluminum or stainless steel.

Also provided along U-shaped trough 12 is steam delivery system 26 having a steam inlet 28 coupled to a means for providing pre-generated steam (not shown). Steam jacket 25 surrounds the lower portion of U-shaped trough 12 and acts to heat the conductive material of trough 12. Additionally, steam spray nozzles 24 are provided for supplying steam to the interior of U-shaped trough 12. An ambient temperature water delivery system 34 provides water to the interior of U-shaped trough 12. Water delivery system 34 includes an inlet 36, coupled to a water supply (not shown), which provides water to conduit 30. Conduit 30 includes a plurality of water delivery nozzles 32, arranged along one side of the upper portion of U-shaped trough 12, to deliver the ambient temperature water provided by the water delivery system to whole cloves 17.

In operation, cloves are loaded through hopper 20 into U-shaped trough 12 and are transported along in the direction of arrow 21 by vanes 15 due to the counterclockwise rotation of screw 14. As the cloves pass along trough 12, the temperature of the cloves rises as a result of heat transfer from trough 12 and steam jacket 25. Steam is provided to the interior 13 of U-shaped trough 12 by steam spray nozzles 24. This steam provides both moisture and heat to the cloves, increasing the heat of the cloves through condensation of the steam thereon. Further, ambient temperature water is provided by spray nozzles 32 to interior 13 to provide additional moisture to the cloves, thereby increasing the moisture content thereof. As the cloves exit trough 12 through delivery shoot 38, they will have attained a temperature of approximately 80° Celsius and a moisture content of approximately 35%.

In one analysis of a commercial clove blend wherein a comparison was drawn between a conventional process and the process of the invention, whole cloves entering hopper 22 with a moisture content of approximately 10.5% and a clove oil content of 19.6% exited conditioning apparatus 10 with a moisture content of 33.2% and a clove oil content of 18.5%. In a conventional water soak process, the moisture content of the cloves was 31.6% with a clove oil content of 18.4%.

Apparatus 10 can achieve this conditioning process in a substantially shorter period of time than required by the conventional process. For example, a 1-ton batch of cloves can be processed in approximately 3.5 minutes using only 0.3-ton of 80° Celsius steam. When compared with a conventional process, wherein approximately 5 hours of soaking in 3-tons of water and 20 hours of draining thereafter is required, the vast improvement in processing whole cloves achieved by the present invention is readily apparent.

A conditioning apparatus sufficient for use in the present invention is currently available from G. B. E. Legg Ltd., GBE House, Newbury Road, Andover Hampshire, SP10 4DW England.

Subsequent to the conditioning procedure described above, whole cloves 17 may be subjected to a flattening process before provision to a shearing process. Flattening of the conditioned whole cloves before shearing enhances the quality of the cut product by facilitating formation a moist, composition of cloves for provision to a cutting apparatus, described below, but is not necessary to production of a suitable product.

Figure 2:
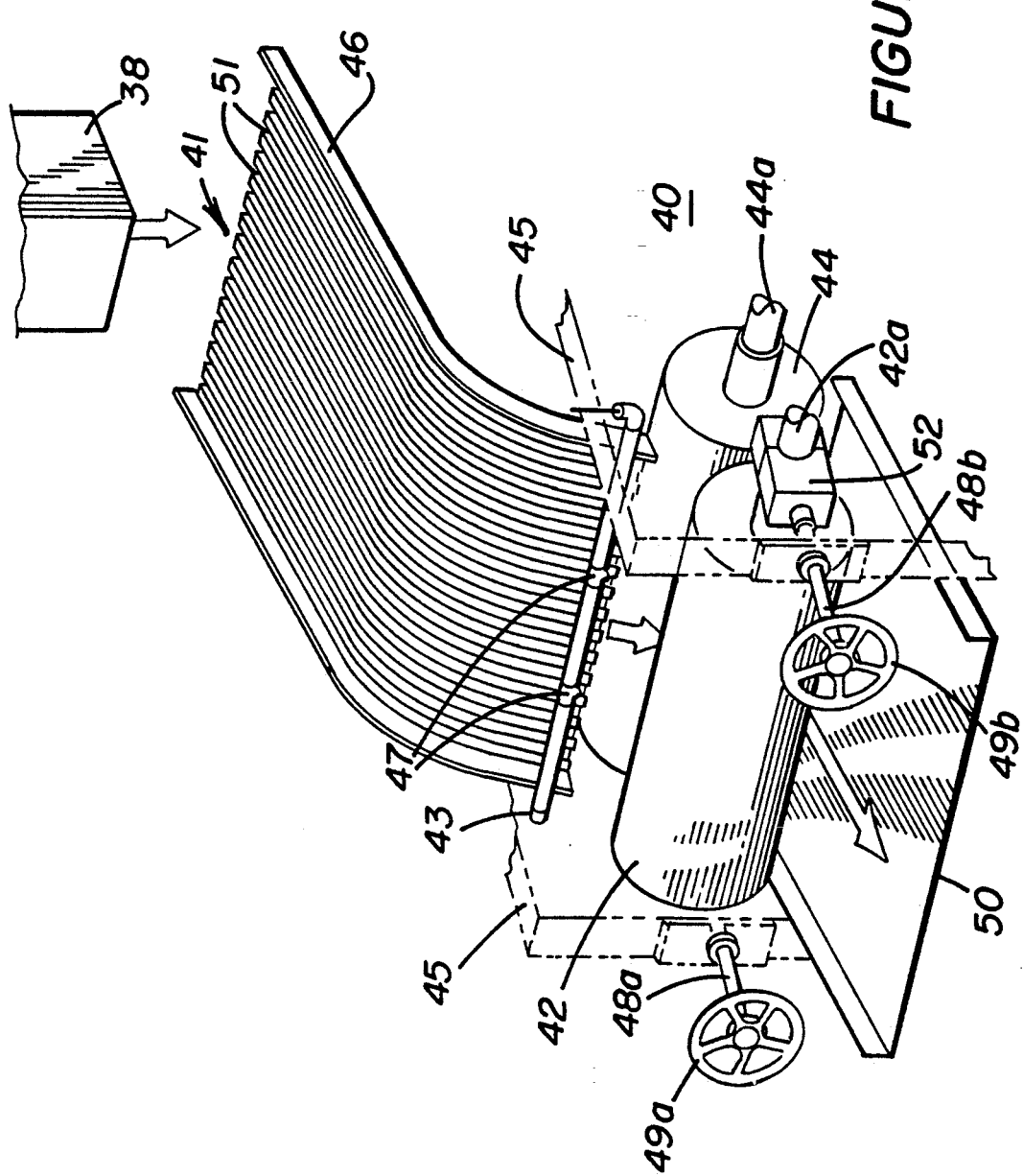
FIG. 2 is an isometric view of an apparatus for flattening cloves which are conditioned by the apparatus of FIG. 1 in accordance with the method and apparatus of the present invention.

FIG. 2 is a simplified, perspective view of a flattening apparatus for use in accordance with the present invention.

Flattening apparatus 40 comprises flattening rollers 42 and 44, which are mounted to a support structure 45. (The specific structural characteristics of support structure 45 are not detailed and may comprise any number of suitable configurations depending on the desired processing system configuration.) Rollers 42 and 44 are oriented to rotate in opposite directions, such as clockwise and counterclockwise, respectively, for passing therebetween the conditioned whole cloves output from conditioning apparatus 10. Feed tray 46 may be arranged to receive conditioned whole cloves output from delivery shoot 38. Feed tray 46 is generally ramped downward in the direction of feed rollers 42 and 44 to provide a gravity feed of the conditioned whole cloves thereon to flattening rollers 42 and 44. Feed tray 46 may be coupled to means for vibrating the tray to assist in provision of the cloves to the flattening area between rollers 42 and 44. Flattening rollers 42 and 44 may both be driven into rotation by a motor (not shown) coupled to drive shafts 42a and 44a. The distance separating rollers 42 and 44 is adjusted based on the size of the cloves being processed and/or the grade of product desired. Such distance may be adjusted by means of threaded screws 48a and 48b coupled to adjustment wheels 49a and 49b, respectively, provided in support structure 45 Threaded screws 48a and 48b are coupled to a bearing structure 52 which surrounds shaft 43 to support flattening roller 42. As will be understood by those skilled in the art, by rotating adjustment wheels 49a and 49b, one may position roller 42 at a plurality of different distances with respect to roller 44. Catch plate 50, also coupled to a vibrating means (not shown), is provided below rollers 42 and 44 for receiving the flattened, conditional whole cloves. Conduit 43 having a plurality of spray nozzles 47, is provided for supplying a steam spray to the conditioned cloves as they enter the region between rollers 42,44.

In operation, as whole cloves are passed along feed tray 46 in the direction of arrows 41, grooves 47 in feed tray 46 provide an even flow of whole cloves submitted to the area between rollers 42 and 44. Steam is provided to the whole cloves as they are passed into the area between rollers 42 and 44 by steam spray nozzles 47 to raise the temperature of the cloves before they pass through the rollers. Heating the cloves in this manner increases the efficiency of the flattening process. As the moisturized cloves are passed through the area between rollers 42 and 44, they are easily flattened, having been conditioned to a more pliable form, and proceed to catch tray 50 for provision to the outting apparatus described below.

A flattening apparatus suitable for use in the present invention is currently available from a number of suppliers, including, for example, Flattener Type R24/R30 manufactured by GBE Legg, supra. As will be recognized by those skilled in the art, any number of modifications may be made to flattening apparatus 40, which are well within the scope of the contemplation of the present invention. Further, as noted above, flattening of the whole cloves after the conditioning process is not necessarily required, but improves the quality of the cut clove product subsequent to the shearing process described below.

Figure 3:
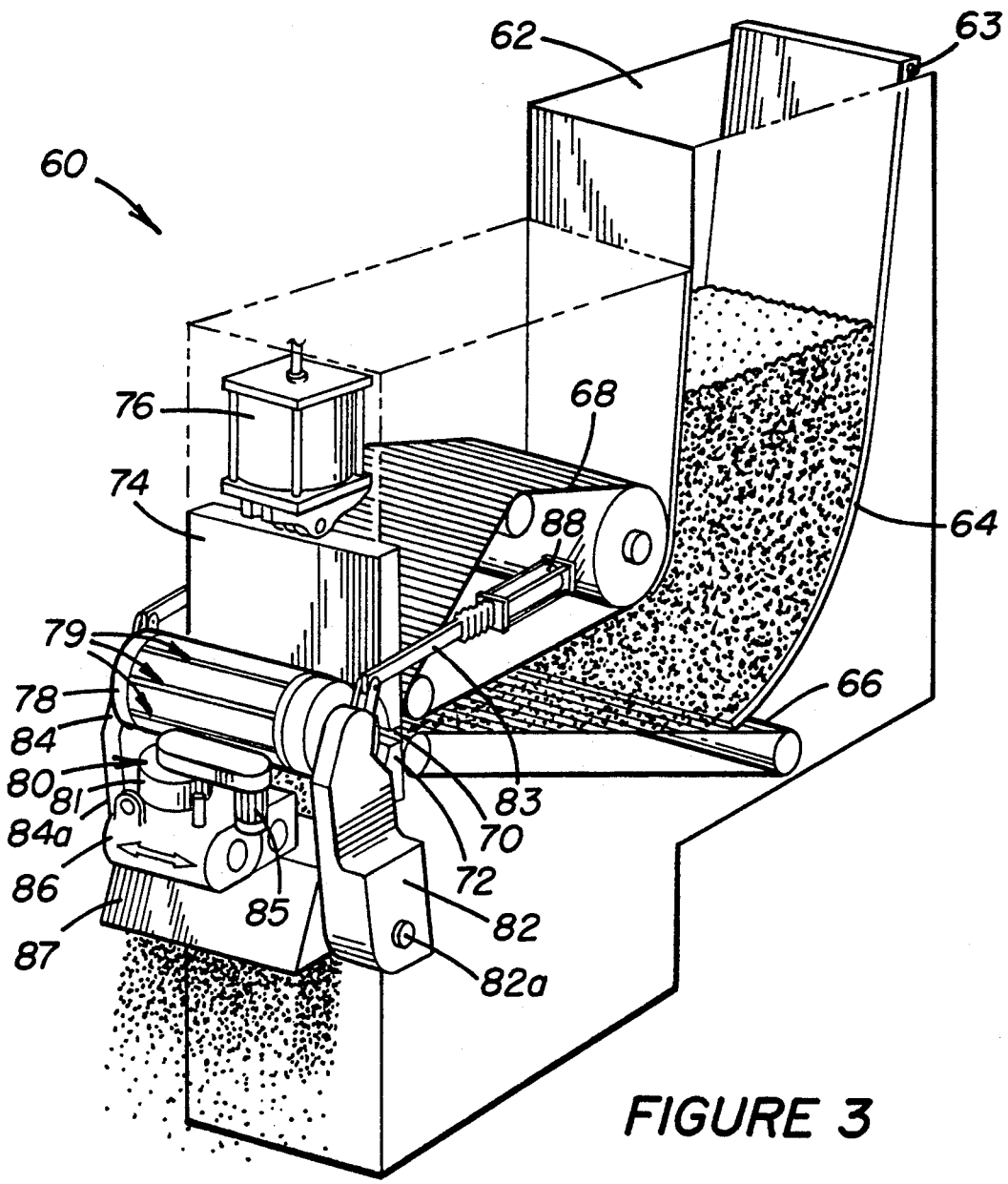
FIG. 3 is an isometric view of an apparatus for cutting conditioned cloves in accordance with the method and apparatus of the present invention.

FIG. 3 is a simplified, perspective view, of an apparatus for cutting the conditioned cloves utilized in accordance with the present invention. Apparatus 60 includes a hopper 62 for receiving the conditioned, whole cloves from delivery chute 38 or the conditioned, flattened whole cloves from catch tray 50. Optionally, hopper 42 may include a panel type compactor assembly 64 which forms a false rear wall in hopper 62 and functions to push the product between two slotted conveyor bands 66 and 68. Seals (not shown) are provided between the edges of panel assembly 64 and the sides of hopper 62 to ensure no clove material is lost during compacting. It should be recognized that panel type compactor 64 is not necessary for the proper functioning of apparatus 60, but the provision of such a compactor assists in maintaining the flow of clove product to conveyor 66. Compactor 64 is coupled by hinge 63 at the upper portion of hopper 62 to allow for any variable compacting stroke and compacting stroke speed. In one embodiment, a variable speed drive motor (not shown) supported on a hinged motor plate attached to the rear of the hopper is coupled to an eccentric plate and connecting rod assembly (not shown) to power compactor 64. Power is provided to slotted conveyor belts 66 and 68 by a motor and gear arrangement (not shown). In one embodiment, such a motor and gear arrangement allows conveyor belts 66 and 68 to be reversible. Conveyor belts 66 and 68 are arranged in a convergent form to provide the cloves to a mouth portion 70 formed by lower wall 72 and upper wall 74. Belts 66 and 68 are slotted to provide traction to force the conditioned cloves along the length of the belts. Upper wall 74 is coupled to pneumatic cylinder 76 to which constant air pressure is provided to maintain pressure stabilization on wall 74 as the clove composition is fed into the mouthpiece 70 by belts 66 and 68.

Knife drum 78 (detailed in FIG. 3b) is mounted adjacent to mouthpiece 70 and includes a plurality of cutting knives 79 which act to cut the cloves as they pass through mouthpiece 70. Grinding apparatus 80 (detailed in FIG. 3c) is provided to continually sharpen cutting knives 79 as they are rotated during the outting process. Knife drum 78 is mounted via support arms 82 and 84 which are hinged at their lower ends 82a and 84a and are coupled via linkage arms 83 to pneumatic cylinders 84 to provide a tension on knife drum 78 thereby applying pressure during the cutting process. In one embodiment, (FIG. 3b) knife drum 78 includes a five-faced casted drum 71 for mounting knives 79. A thermostatically controlled heater (not shown) is provided in casted drum 71. Knives 79 are secured to casted drum 71 by gripper plates 73; plates 73 retain the knives in position on the drum and are set to hold the knives securely while permitting sufficient movement to enable the knives to advance toward mouth portion 70 by a feeder arrangement, as discussed below. Only leading edge 73-1 of gripper plate 73 contacts the knife. The firmness of the grip on knife 79 is determined by tapered shim 77, placed below gripper plate 73 in relation to drum 71.

In operation as the moisturized cloves are passed into hopper 62, converging conveyor belts 66 and 68 compress the cloves into a wedge shaped "cheese" composition and force the composition to be extracted through mouthpiece 70. Pressure is applied to the top member 74 to compensate for variations in the volume of product fed by belts 66 and 68 into the mouthpiece. Top member 74 rises and falls accordingly in order to maintain a constant compression on the composition. The pressure applied to top member 74 may be set as desired by adjustment of pneumatic cylinder 76 for optimum formation of the composition for outting. Roller 78 continually rotates in a clockwise direction to provide knives 79 to mouthpiece 70 to cut the composition as it is extracted therethrough. The Width of the cut may be varied as desired by varying the speed at which the clove product is provided to the cutting roller 78.

Figure 3A:
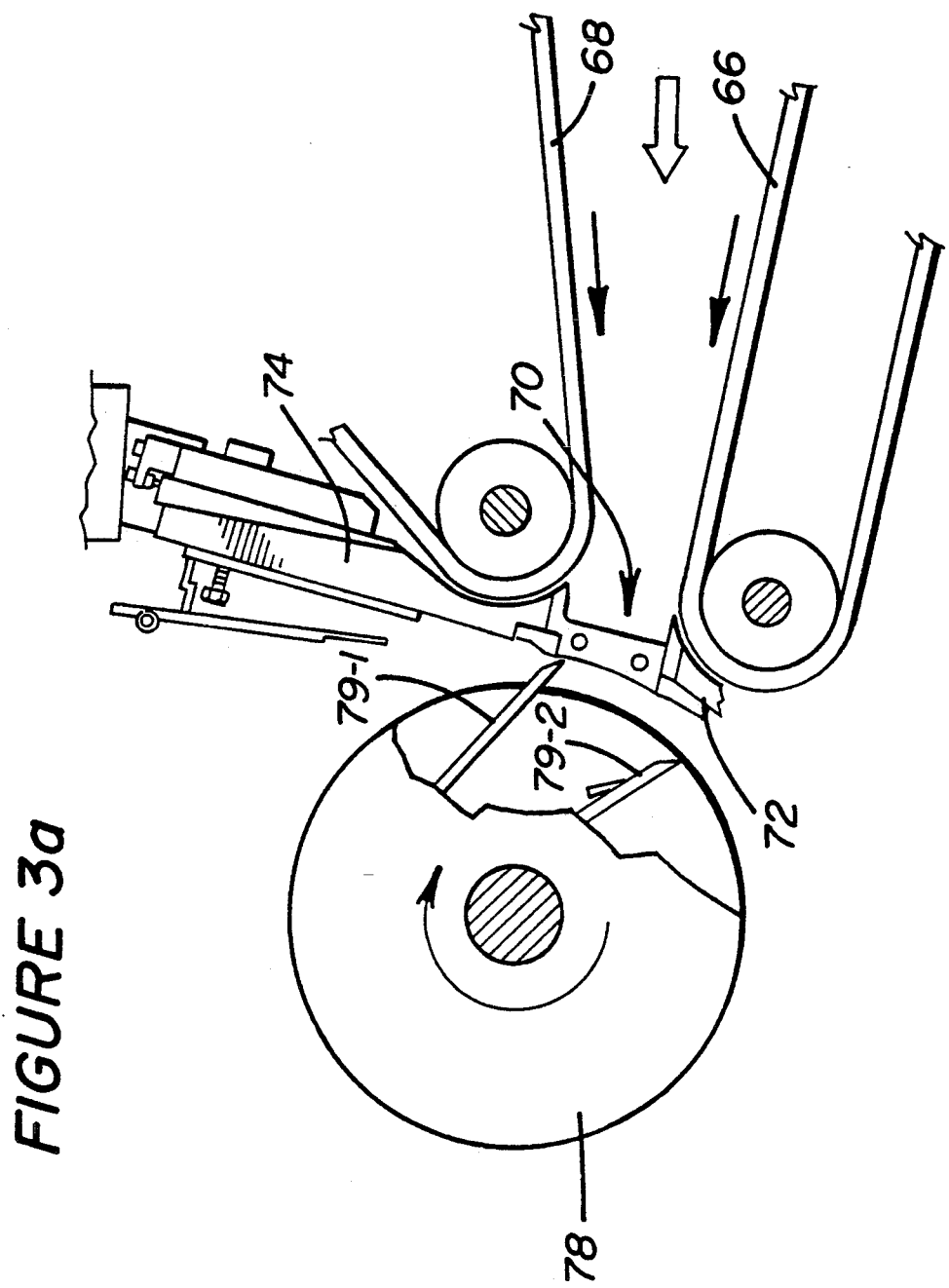
FIG. 3a is a simplified cross-section of the knife drum and mouthpiece sections of the apparatus of FIG. 3.
Figure 3B:
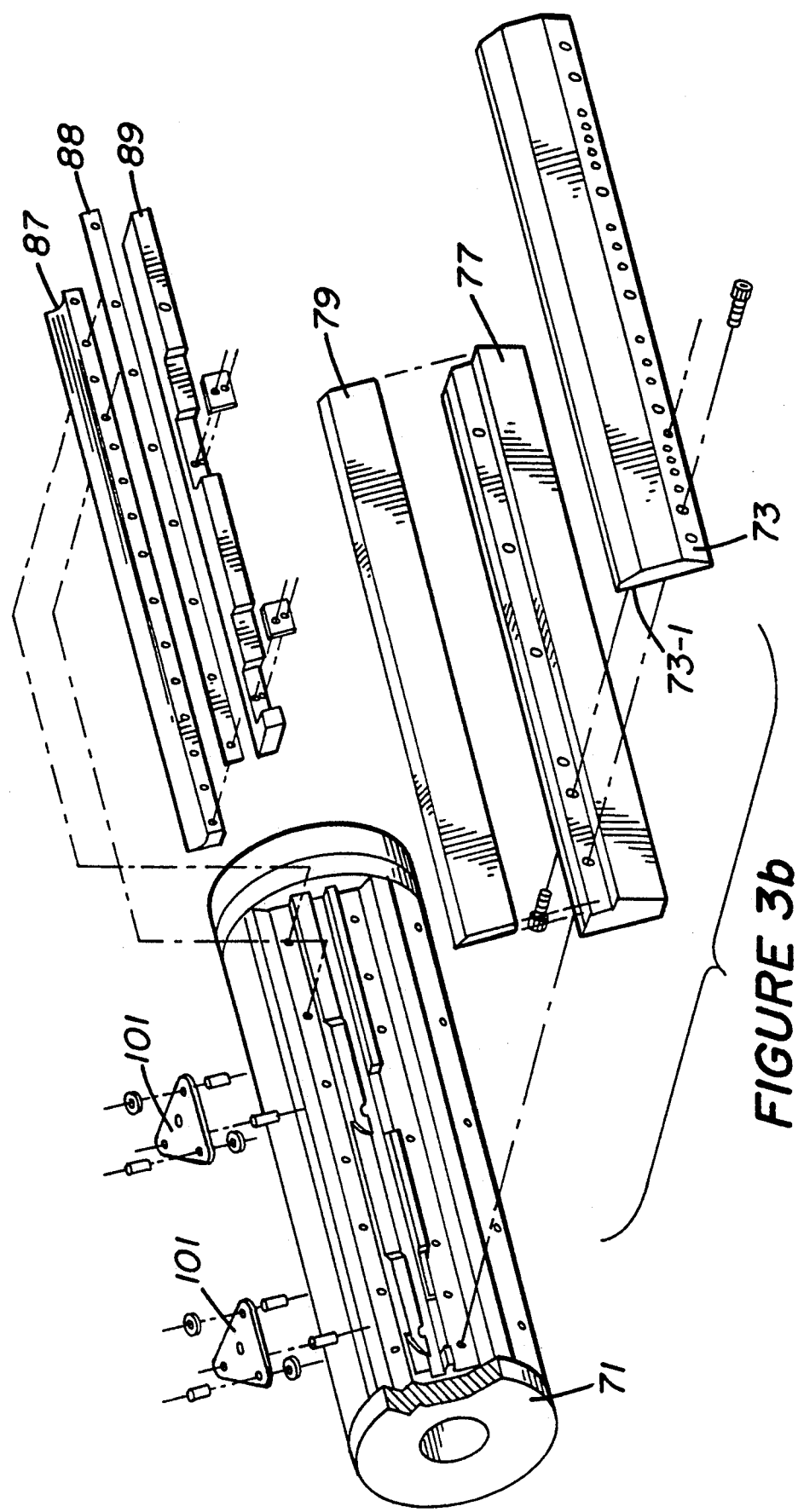
FIG. 3b is an exploded, perspective view of the knife drum of the apparatus of FIG. 3.
Figure 5:
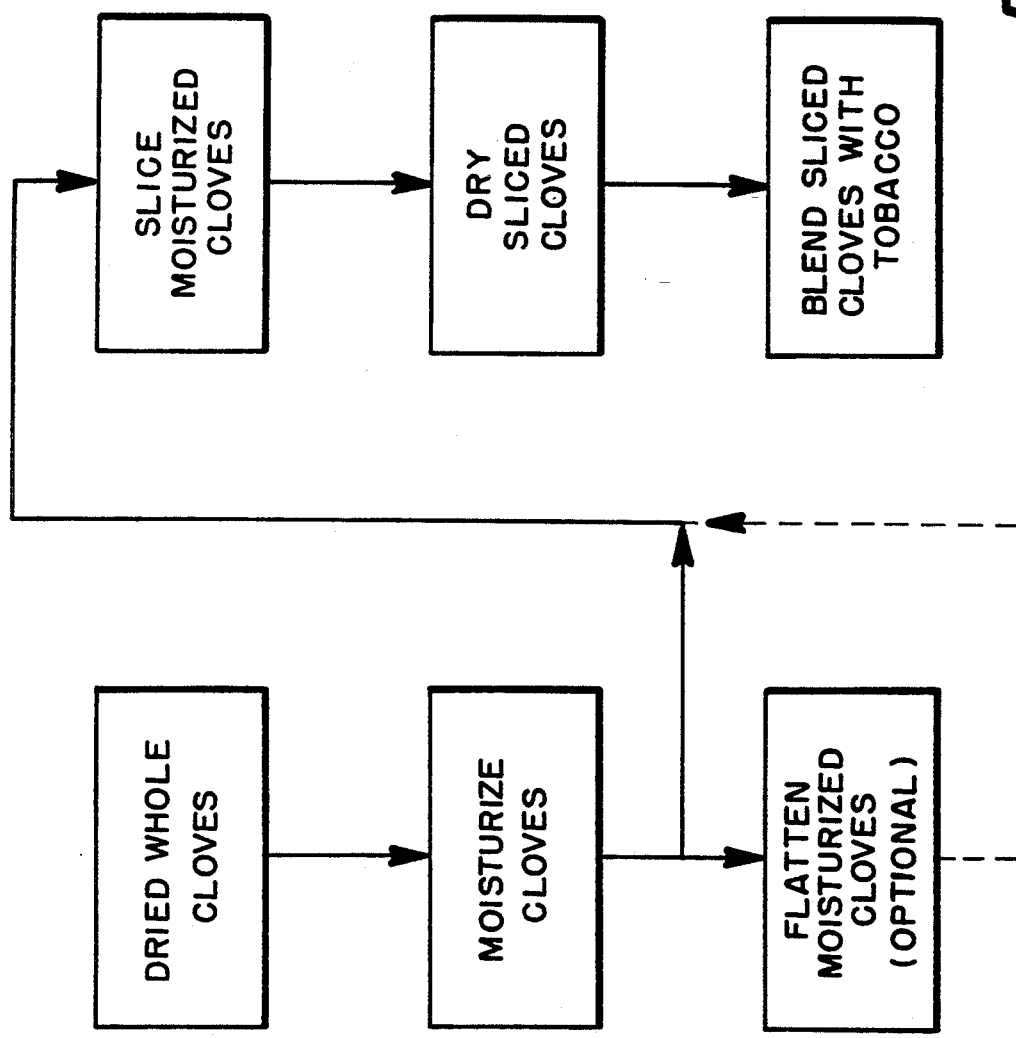
FIG. 5 is a flow diagram illustrating the steps of the method for processing of dried whole cloves, in accordance with the method of the present invention.

FIG. 3a is a cross section of the mouthpiece 70 and knife drum 78 of the apparatus shown in FIG. 3. As shown therein, knives 79 are extended from knife drum 78 to slice the composition "cheese" extracted from the apparatus. A first knife 79-1 is shown in the extended position, and a second knife, 79-2 is shown in the retracted position. A pneumatically operated mechanism automatically extends each knife 79 at mouthpiece 70 and at grinding apparatus 80. As the knives will be worn down during the constant grinding by apparatus 80. Each knife is advanced by a feeder arrangement including feed levers 101, secured to drum 71. Feed levers 101 are caused to rotate, thereby advancing each knife in increments of, for example, 0.002 in. at specified intervals. As will be well understood, such intervals may be set based upon rotation of the drum or after a specific time period.

Sharpening apparatus 80 maintains each cutting knife 79 in prime condition during processing. Sharpening apparatus 80 includes a grinder assembly, including a grindstone 81, drive motor 85, carriage 86, transverse motor (not shown) and transverse assembly (not shown). Grindstone 81 and drive motor 85 are mounted on carriage 86 which transverses the width of knives 79 to maintain the cutting edge of each knife and the required cutting radius of the drum. Drive motor 85 is coupled to timing belt 105 to rotate grindstone 81. The transverse motor is coupled to drive chain 107 to provide lateral motion for carriage 86.

The cut product is expelled through chute 85 and is now ready to proceed to the drying process.

A milling apparatus suitable for use in accordance with the present invention discussed above is currently available from GBE Legg, supra, as well as other suppliers.

One objective of the drying process is to provide controlled uniform drying of the out prepared product at low temperatures and low air flow with minimal agitation. This objective is accomplished in a process which includes subjecting the product to a multitude of different air flow directions and air flow temperatures over the course of the total drying process. A number of conveyor dryers are suitable for this purpose. A dryer suitable for use in accordance with the present invention is shown in FIGS. 4a and 4b.

Drying apparatus 90 includes four separate drying compartments 92, 94, 96, 98, which provide both varying degrees of temperature and varying directions of air flow to the dried product. Conveyor 100 serves to pass the out product through the four drying compartments and thus provide a means to continually add processed cloves thereto to accomplish suitable drying of the composition. Conveyor 100 is mounted about wheels 102 and 104, and powered by motor 106 coupled by belt 108 to wheel 104. In one embodiment, conveyor 100 is approximately 3.2 meters wide, approximately 38 millimeters thick, and includes 1.15 millimeter perforations along the length of the conveyor to allow air flow therethrough. A feed and extension assembly 112 provides area for receiving the slivered component from, for example, chute 85 of cutting apparatus 60. Feed extension assembly 112 includes wheel 102 and rabbit ear level assembly 110 which acts as a leveler to ensure a uniform carpet of clove material on belt 108. Preferably, feed extension assembly 112 is approximately 6 feet long.

Processed cloves are loaded on conveyor 100 at feed extension assembly 112. Conveyor 100 carries the cloves into drying chamber 92, which is approximately 10 ft. 10 in. in length and includes first and second intermediate sections 92-1 and 92-2. Intermediate section 92-1 includes fan assembly 93 for providing an upward flow of air in the chamber. Likewise, intermediate section 92-2 includes fan assembly $93_2$ for providing an upward flow of air in the chamber. Also coupled to drying chamber 92 is blower assembly 114, which provides an upward component of air flow which acts to filter out the moisture generated in the chamber.

Drying chamber 94 comprises first and second intermediate assemblies 94-1 and 94-2, each of which are approximately 7 ft. 2 in. in length and provide areas of upward air flow. Intermediate assembly 94-1 includes fan assembly $95_1$ to provide downward air flow in the chamber and also includes ducts 115 coupled to blower assembly 114 for providing downward air flow from blower assembly 114. Intermediate section 94-2 includes fan assembly $95_2$ for likewise providing an upward air flow.

Drying compartment 96 is similar to drying compartment 94 in that it includes two intermediate sections 96-1 and 96-2, each being approximately 7 ft. 2 in. in length. Whereas in compartments 92 and 94 fan assemblies $93_1$, $93_2$, $95_1$ and $95_2$ are mounted below the conveyor belt 100, in compartment 96, fan assemblies $96_1$, $96_2$ and $96_3$ are mounted above the conveyor 100 to provide downward flow of air within the chamber. A second blower assembly 116 is provided and includes duct 117 for venting the downward moisturized air flow in drying chamber 96. Similarly, drying chamber 98 includes intermediate sections 98-1 and 98-2, and duct 118 coupled to blower assembly 116 for providing downward flow of air in conjunction with fan assemblies $99_1$, $99_2$ and $99_3$.

Finally, a cooler section 120 is provided at the conclusion of the conveyor path to provide ambient air flow using fan assembly 121 directing air flow from top to bottom. Cooler section 120 is approximately 5'8" long.

The temperature component in each of the drying compartments 92, 94, 96, and 98 is variable. Normally, the air flow is directed as described above with compartment 92 providing air flow from bottom to top, compartment 94 providing air flow from bottom to top, compartment 3 providing air flow from top to bottom, and compartment 4 providing air flow from top to bottom. In addition, drying compartment 92 has a nominal temperature of 65° Celsius, drying compartment 94 a temperature of 60° Celsius, drying compartment 96 a nominal temperature of 54° Celsius and drying compartment 98 a nominal temperature of 54° Celsius. Temperature in compartment 98 may be maintained by, for example, a steam heating assembly (not shown).

In general, the moisture content of the wet product entering the dryer apparatus 90 is approximately 35%. At an input rate of 2300 kilograms per hour, the product leaving the cooler assembly 120 has a moisture content of approximately 13% and a temperature of approximately 38° Celsius. The corresponding output rate of drying apparatus 90 is approximately 1700 kilograms per hour.

The above-described drying apparatus allows each of the four component zones to include drying conditions which are set independently of each other. Such an apparatus is currently available from Proctor & Schwartz, Inc. 251 Gibralter Road, Horsam, Pa. It should be recognized by those skilled in the art that any number of variations are possible on the drying apparatus and are within contemplation of the invention. Comparing two batches of processed cloves, one manufactured using the conventional method and the other manufactured using the method of the present invention, the following table shows the moisture and clove oil content of the cloves during each step of the process for each particular batch:

|  | CONVENTIONAL METHOD | | INNOVATIVE METHOD (40 CPI) | |
|---|---|---|---|---|
|  | Moisture (%) | Clove Oil (%) | Moisture (%) | Clove Oil (%) |
| Initial (whole clove) | 10.5 | 19.6 | 10.5 | 19.6 |
| After soaking | 41.6 | 18.4 | — | — |
| After conditioning | — | — | 33.2 | 18.5 |
| After flattening | — | — | 32.4 | 18.3 |
| After cutting | 41.2 | 18.1 | 32.3 | 17.8 |
| Particle size (%) after cutting/drying Mesh size | | | | |
| >2.8 mm | | 2.5 | | 2.9 |
| 0.7–2.8 mm | | 86.8 | | 89.9 |
| <0.7 mm | | 10.8 | | 7.2 |

The above-described invention provides a continual method for processing slivered clove pieces for use in tobacco mixtures and the like that results in no significant increase in the loss of clove oil over that of conventional processes. This percentage of the homogeneity of the cloves in the ideal particle size (approximately 0.72–2.8 millimeters) is higher whereas the percentage of undesirable small particles or dust (e.g., less than 7 millimeters) is lower when cloves were processed by the above-mentioned system, as compared with conventional clove processes.

Furthermore, a comparison was made of two identical tobacco rags, one made using cloves manufactured from the conventional method and the other cloves manufactured from the above inventive process of the present invention. Using the International Organization for Standardization method yielded results as follows:

|  | HAND MADE (Non Filter) | | MACHINE MADE (Filter) | |
|---|---|---|---|---|
|  | Blend using conventional processed cloves | Blend using innovative processed cloves | Blend using conventional processed cloves | Blend using innovative processed cloves |
| PHYSICAL | | | | |
| Cigarette Weight (gm) | 2.04 | 2.10 | 1.08 | 1.08 |
| BLEND CHEMISTRY | | | | |
| Nicotine (% dwb) | 1.3 | 1.3 | 1.3 | 1.4 |
| Reducing Sugar (% dwb) | 6.7 | 6.6 | 7.3 | 7.4 |
| Clove oil (% dwb) | 4.0 | 4.2 | 4.2 | 4.4 |
| SMOKE CHEMISTRY | | | | |
| Puff Number | 19.6 | 20.6 | 13.1 | 13.3 |
| Nicotine (mg/Cig) | 2.3 | 2.5 | 1.6 | 1.6 |
| Tar (mg/Cig) | 47.4 | 48.7 | 27.5 | 28.5 |
| Clove oil (mg/Cig) | 9.5 | 9.7 | 5.0 | 4.9 |

The above table demonstrates the resulting tobacco blends using the conventional method and the method of the present invention yield no substantial change in the physical aspect, blend, or smoke chemistries of the handmade vs. machine made cigarettes containing cloves processed using the instant process in comparison to cigarettes containing conventional processed cloves.

Thus, the above-cited innovative clove processing method and apparatus provide a highly improved, automated method and apparatus for the production of clove particles for use in cigarettes and the like. The many features and advantages of the method and apparatus of the present invention will be apparent to those skilled in the art from the description of the preferred embodiments, the claims, and the drawings. Numerous variations are possible as will be apparent to those skilled in the art; such variations are intended to be within the scope of the invention as defined by the specification and the following claims are intended to cover all the modifications and equivalents falling within the scope of the invention.

What is claimed is:

1. A continuous method for processing dried whole cloves, said cloves having an initial moisture content, and containing a quantity of clove oil, into particles suitable for inclusion in tobacco mixtures, comprising the steps of:
   (a) increasing the moisture content of the whole dried cloves to provide moisturized whole cloves by simultaneously
      (i) heating the cloves,
      (ii) applying steam to the cloves, and
      (iii) applying water to the cloves;
   (b) slicing the moisturized whole cloves into finely chopped clove particles; and
   (c) drying the clove particles by passing an airflow over the clove particles, the airflow being of varying direction and temperature thereby maintaining the clove oil content of the particles.

2. The method of claim 1 wherein said step (a) is accomplished by
   (1) providing the cloves in a heat conducting trough having a top and a bottom,
   (2) injecting steam into the trough from a position at the bottom of the trough,
   (3) injecting a quantity of water into the trough at the top of the trough; and
   (4) continually moving the cloves through the trough during steps (2) and (3).

3. The method of claim 1 further including the step of flattening the cloves prior to said step (b).

4. The method of claim 1 wherein said step (c) includes
   providing at least a first temperature and airflow on the clove particles, and
   providing at least a second temperature and airflow on the clove particles.

5. The method of claim 4 wherein said step (c) includes
   providing at least a third temperature and airflow on the clove particles, and
   providing at least a fourth temperature and airflow on the clove particles.

6. The method of claim 1 wherein said step (c) comprises providing the clove particles to a continuous conveyor drying apparatus, the apparatus providing at least two directions of airflow on the clove particles, the apparatus providing at least two temperatures of airflow on the clove particles.

7. A method for processing dried whole cloves having an initial moisture content into particles suitable for inclusion in tobacco mixtures, comprising the steps of:
 (a) raising the moisture content of the whole dried cloves by
  (i) providing the cloves in a heat conducting receptacle;
  (ii) simultaneously providing heat to the receptacle, and steam and water into the receptacle;
 (b) continuously slicing the moisturized whole cloves into finely chopped particles; and
 (c) drying the clove particles at a plurality of different convective air drying rates and temperatures.

8. The method of claim 7 wherein said step (a)(i) includes
 providing the cloves in a trough having means for continually moving the cloves through the trough.

9. The method of claim 7 further including the step of flattening the moisturized whole cloves prior to said step (b).

10. The method of claim 7 wherein said step (c) includes
 providing at least a first temperature and airflow on the clove particles,
 providing at least a second temperature and airflow on the clove particles,
 providing at least a third temperature and airflow on the clove particles, and
 providing at least a fourth temperature and airflow on the clove particles.

11. A method for processing dried whole cloves having an initial moisture content into particles suitable for inclusion in tobacco mixtures, comprising the steps of:
 (a) raising the moisture content of the whole dried cloves by
  (i) providing the cloves in a heat conducting receptacle;
  (ii) simultaneously providing heat, steam and water to the receptacle;
 (b) flattening the moisturized whole cloves through two oppositely rotating rollers;
 (c) continuously slicing the moisturized whole cloves into finely chopped particles; and
 (c) drying the clove particles at a plurality of different convective air drying rates and temperatures.

* * * * *

UNITED STATES PATENT AND TRADEMARK OFFICE
CERTIFICATE OF CORRECTION

PATENT NO. : 5,279,312

DATED : January 18, 1994

INVENTOR(S) : Wu, et al.

It is certified that error appears in the above-identified patent and that said Letters Patent is hereby corrected as shown below:

Col. 1, line 7: out — should read --cut--

Col. 1, line 17: out — should read -- cut--.

Col. 1, line 25: outting — should read --cutting--

Col. 1, line 27: --are-- should be deleted

Col. 2, line 22: out — should read -- cut --

Col. 2, line 63: outting — should read -- cutting--

Col. 3, line 10: outting — should read -- cutting--

Col. 3, line 38: after --FIG.-- before --shows-- insert "1"

Col. 3, line 62: --shoot-- should be "chute" — should read -- shoot --

Col. 4, line 27: --shoot-- should be "chute" — should read -- shoot --

Col. 4, line 59: outting — should read -- cutting--

Col. 5, line 7: --shoot-- should be "chute" — should read -- shoot --

UNITED STATES PATENT AND TRADEMARK OFFICE
CERTIFICATE OF CORRECTION

PATENT NO. : 5,279,312

DATED : January 18, 1994

INVENTOR(S) : Wu, et al.

It is certified that error appears in the above-identified patent and that said Letters Patent is hereby corrected as shown below:

Col. 5, line 21, after --45-- before --Threaded-- should be a period

| | |
|---|---|
| Col. 5, line 45: outting | should read -- cutting -- |
| Col. 6, line 33: outting | should read -- cutting -- |

Col. 6, line 52, after --operation-- before --as-- should be a comma

| | |
|---|---|
| Col. 6, line 63: outting | should read -- cutting -- |
| Col. 6, line 66: Width | should read -- width -- |
| Col. 7, line 37: out | should read -- cut -- |
| Col. 7, line 50: out | should read -- cut -- |
| Col. 8, line 4: 93 | should read -- $93_1$ -- |
| Col. 12, line 22: (c) | Claim 11, line 21: (d) |

UNITED STATES PATENT AND TRADEMARK OFFICE
CERTIFICATE OF CORRECTION

PATENT NO. : 5,279,312

DATED : January 18, 1994

INVENTOR(S) : Wu, et al.

It is certified that error appears in the above-identified patent and that said Letters Patent is hereby corrected as shown below:

Col. 12, line 22: --plurality-- should be --variety--

Claim 11, line 21: variety

Signed and Sealed this

Twenty-eighth Day of June, 1994

Attest:

BRUCE LEHMAN

*Attesting Officer*    *Commissioner of Patents and Trademarks*